(12) United States Patent
Cloutier

(10) Patent No.: US 8,811,960 B2
(45) Date of Patent: Aug. 19, 2014

(54) METHODS, APPARATUS AND COMPUTER-READABLE MEDIA FOR PROVIDING CALLER IDENTIFICATION INFORMATION

(75) Inventor: Leo Cloutier, Falls Church, VA (US)

(73) Assignee: Bright House Networks, LLC, East Syracuse, NY (US)

( * ) Notice: Subject to any disclaimer, the term of this patent is extended or adjusted under 35 U.S.C. 154(b) by 91 days.

(21) Appl. No.: 13/468,242

(22) Filed: May 10, 2012

(65) Prior Publication Data

US 2013/0210399 A1    Aug. 15, 2013

Related U.S. Application Data

(60) Provisional application No. 61/599,065, filed on Feb. 15, 2012.

(51) Int. Cl.
*H04M 11/00* (2006.01)

(52) U.S. Cl.
USPC ........... 455/415; 455/416; 455/417; 455/418; 455/412.2; 455/412.1; 455/456.3

(58) Field of Classification Search
USPC ........... 455/415, 417, 416, 418, 412.2, 412.1, 455/456.3
See application file for complete search history.

(56) References Cited

U.S. PATENT DOCUMENTS

| | | | |
|---|---|---|---|
| 2010/0184486 A1* | 7/2010 | Gupta | 455/567 |
| 2011/0190012 A1 | 8/2011 | Williams | |
| 2011/0202956 A1 | 8/2011 | Connelly et al. | |
| 2011/0205329 A1 | 8/2011 | Willis | |
| 2012/0136721 A1* | 5/2012 | Ullah | 705/14.53 |
| 2012/0204216 A1* | 8/2012 | Connelly et al. | 725/106 |

* cited by examiner

*Primary Examiner* — Khalid Shaheed

(74) *Attorney, Agent, or Firm* — Withrow & Terranova, PLLC

(57) ABSTRACT

A method, apparatus and computer-readable media for providing caller identification information. A server receives a call notification that identifies a call originating from a calling address for connection to a destination address associated with a wireless destination device. The server makes the determination that the wireless destination device is within a predetermined proximity of a media station. Based on the determination, the server communicates a caller identifier to the media station for presentation on a display device communicatively coupled to the media station.

15 Claims, 12 Drawing Sheets

METHODS, APPARATUS AND COMPUTER-READABLE MEDIA FOR PROVIDING CALLER IDENTIFICATION INFORMATION

RELATED APPLICATIONS

This application claims the benefit of provisional patent application Ser. No. 61/599,065, filed Feb. 15, 2012, the disclosure of which is hereby incorporated herein by reference in its entirety.

FIELD OF THE DISCLOSURE

The present disclosure relates generally to telecommunications between a calling device and a wireless destination device, and in particular to providing caller identification information to a user of the wireless destination device.

BACKGROUND

Many conventional cellular phones include a display screen that provides the telephone number of the calling party on the display screen when a call is being connected to the cellular phone. This allows the receiving party to choose whether or not to accept the call based on the displayed caller identification information.

Typically, caller identification (ID) information is included in the call signaling that is used to establish a connection between the calling device and the destination device. This caller ID information may also be provided to equipment other than the destination device. For example, cable operators, sometimes referred to as multiple system operators, who may provide both television services and wireline telephone services to a consumer, offer a service that displays caller ID information on a television. In particular, because the cable operator provides wireline telephone service to the consumer, the cable operator receives the call signaling information associated with any new telephone call that is destined for the wireline telephone of the consumer. The cable operator extracts the caller ID information from the call signaling information, and sends the caller ID information to the consumer's set top box, which causes the caller ID information to be displayed on the consumer's television. This allows the consumer to easily identify the initiator of a phone call without having to view the telephone display.

While the ability for a television viewer to view caller ID information associated with telephone calls directed to a wireline phone is beneficial, conventional wireline phone calls are diminishing and are being replaced by cellular phone calls and voice over internet protocol (VOIP) phone calls. In fact, more and more consumers are dropping wireline telephone service in favor of cellular service and/or packetized voice over internet protocol (VOIP) services. Accordingly, there is a need to provide to a television viewer caller ID information associated with calls that are directed to a wireless destination device.

SUMMARY

The present disclosure relates to providing a caller identifier associated with a call that is destined for a mobile, wireless destination device (WDD) to a media station for presentation on a display device, such as a television, if it is determined that the WDD is within a predetermined proximity of the media station.

In one embodiment, a call originates from a calling address, such as a calling telephone number or a source address used by a packetized voice application. The call is for connection to a destination address associated with a WDD. The destination address may comprise, for example, a telephone number, or a destination address associated with a packetized voice application executing on the WDD. A call notification identifying the call is generated and communicated to a network server. The network server makes a determination that the WDD is within a predetermined proximity of a media station, and based on the determination, sends a caller identifier to the media station for presentation on a display device that is communicatively coupled to the media station.

In one embodiment, the call may be a public switched telephone network (PSTN) call, in which the destination address comprises a telephone number that is associated with the WDD. In another embodiment, the call may be a packetized voice call, such as a voice over internet protocol (VOIP) call, and the destination address may comprise, for example, an IP address, a session initiation protocol (SIP) address, or the like.

In one embodiment, the call notification includes a calling location identifier that identifies a location of a calling device that is associated with the calling address. Calling location information that is based on the calling location identifier is communicated to the media station along with the caller identifier, so the user may determine not only who is attempting to talk with the user, but also the location of the calling party.

In one embodiment, the caller identifier may be included in the call notification, and may be, for example, a telephone number of the calling device, an IP address, or other data included in the call notification, such as an image or video clip. In another embodiment, a user may configure custom caller identifiers for corresponding calling addresses from which the user may receive calls. In this embodiment, upon receipt of a call notification, user-configured information is accessed based on the information contained in the call notification, such as the calling address, and the custom caller identifier provided by the user is extracted and communicated to the media station for presentation on the display device. Such information could include, for example, an icon that corresponds to the caller associated with the calling address, an image that corresponds to the caller associated with the calling address, or an avatar that corresponds to the caller associated with the calling address.

The determination that the WDD is within the predetermined proximity of the media station may be made in any of a number of different ways. In one embodiment, the call notification is received from a wireless service provider that provides wireless service to the WDD. In this embodiment, the call notification may include location data that identifies the location of the WDD. The location data may identify, for example, the location of a cell tower site that is servicing the WDD or may identify longitude and latitude coordinates of the WDD as determined by the wireless service provider. Alternatively, upon receipt of the call notification, a location request message may be sent to the wireless service provider requesting location data that identifies the location of the WDD.

In another embodiment, the media station may determine that the WDD is within the predetermined proximity of the media station, and may provide such information in a location message to a network server. The communication of the location message may then be used as the basis for determining that the WDD is within the predetermined proximity of the media station. In one embodiment, the media station may determine that the WDD is within the predetermined proximity of the media station by determining that the WDD is within a Wi-Fi range of the media station, or of a wireless access point to which the media station is communicatively coupled. In an alternate embodiment, the media station may determine that the WDD is within the predetermined proximity of the media station device based on a user login that identifies the user associated with the WDD as being in proximity of the media station.

In yet another embodiment, the WDD itself may determine that it is within a predetermined proximity of the media station based on a GPS receiver in the WDD. Specifically, the WDD may continually monitor its location, and upon determining that the location is within the predetermined proximity of the media station, communicate this information to the network server.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

The embodiments disclosed herein provide a caller identifier associated with a call destined for a wireless destination device (WDD) to a media station for presentation on a display device, such as a television, if it is determined that the WDD is within a predetermined proximity of the media station. The call may be a conventional public switched telephone network (PSTN) call destined for the WDD by virtue of the telephone number associated with the WDD. Alternatively, the call may be a packetized voice call, such as a voice over internet protocol (VOIP) call, which is destined for the WDD by virtue of an internet protocol or other address used by a packetized voice application that executes on the WDD. In either case, a caller identifier is provided to a media station for presentation on a display device so that the intended recipient of the call can determine who is attempting to call the recipient.

Figure 1:
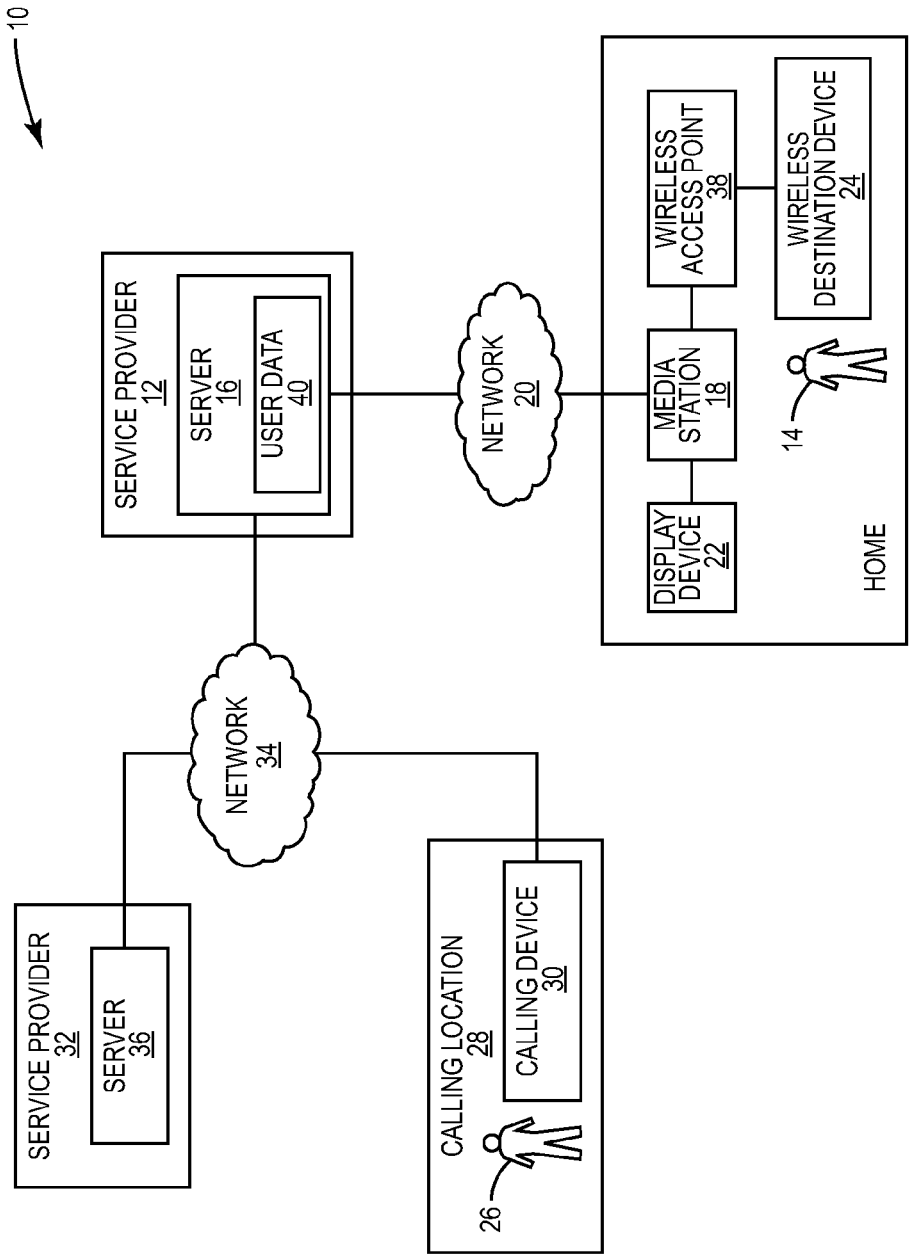
FIG. 1 is a block diagram of an exemplary system in which embodiments of the present disclosure may be practiced.

FIG. 1 is a block diagram of an exemplary system 10 in which embodiments of the present disclosure may be practiced. The system 10 includes a service provider 12 that provides programming services, such as television services, to a user 14. In particular, a server 16, such as a head end, provides video data to a media station 18 via a network 20, typically in response to inputs from the user 14. For example, the user 14 may use a remote control (not illustrated) to select a particular programming channel or video-on-demand (VOD) program. The selection is received by the media station 18 which may, in the case of non-VOD programming, tune to the selected programming channel, or, in the case of a VOD program, communicate with the server 16 to effect delivery of the requested VOD program. The media station 18 presents the selected programming on a display device 22 for viewing by the user 14.

The server 16 may comprise one or more processing devices located in a facility of the service provider 12 suitable for implementing the functionality described herein. The server 16 is coupled to the media station 18 by the network 20, which may comprise any public, private, or combination of public and private networks suitable for transporting data between the server 16 and the media station 18. In one embodiment, the service provider 12 comprises a multiple system operator (MSO) and the network 20 comprises a private hybrid fiber coaxial network. In another embodiment, the service provider 12 comprises a satellite operator, and the network 20 comprises a microwave communications network. In another embodiment, the service provider 12 comprises a telephone carrier, and the network 20 comprises a private telephone network. In yet another embodiment, the service provider 12 comprises an internet video service, and the network 20 comprises the Internet.

The media station 18 comprises a processing device such as a set top box, or a multifunction media center, such as a Sony® Playstation® 3 console, Microsoft® Xbox® console, Nintendo® Wii® console, or the like, that contains programming instructions or circuitry to implement the functionality described herein. The display device 22 may comprise a television, projector and screen, or any other display technology capable of receiving a signal from the media station 18 and presenting it to the user 14. In one embodiment, the media station 18 and the display device 22 may be a single device, such as a Smart TV.

The user 14 is associated with a WDD 24. The WDD 24 may comprise any portable processing device capable of real-time voice communications, such as a smart phone, such as an Apple® iPhone® or Android® based smartphone, a tablet computer, such as an Apple® iPad® tablet computer, or a laptop computer, for example. For purposes of illustration, it will be assumed that the WDD 24 comprises a smart phone.

In one embodiment, the server 16 receives a call notification that identifies a call originating from a calling address for connection to a destination address associated with a WDD, such as the WDD 24. The server 16 makes a determination that the WDD 24 is within a predetermined proximity of the media station 18, and based on the determination, communicates a caller identifier to the media station 18 for presentation on the display device 22 so the user 14 can decide whether or not to answer the call. What constitutes a predetermined proximity may be system dependent and therefore system determined, but could comprise, for example, a wireless range of the media station 18 or of a wireless access point in communication with the media station 18, or may comprise any location within a particular distance from the media station 18.

An example will be provided with reference to a user 26 at a calling location 28 who desires to call the user 14 via a calling device 30. The calling device 30 may comprise, for example, a smart phone, a landline phone, or any other processing device capable of facilitating real-time voice communications. For purposes of illustration, assume that the calling device 30 comprises a smartphone. The calling device 30 has one or more calling addresses associated therewith. A "calling address" as used herein refers to an address used by the calling technology to identify the origination of a call. For example, for a conventional PSTN telephone call, the calling address is the telephone number of the calling device 30, and is associated with the calling device 30 by virtue of, for example, a subscriber identity module (SIM) card, or via circuitry programmed with the particular telephone number. For a packetized voice call, such as a VOIP call, the calling address may comprise a SIP address, SIP Universal Resource Identifier (SIP URI), or IP address which is associated with a packetized voice application that executes on the calling device 30. It should be understood that a call is not limited to a voice call, and may include a combination of audio and video, such as a video call.

In a first embodiment, assume that the call is a conventional PSTN call and the user 26 initiates a telephone call to the user 14 by dialing the phone number associated with the WDD 24. The user 14 subscribes to a cellular phone service that is provided by a third-party service provider 32. The service provider 32 provides a network 34 that includes base stations, base station controllers, and other equipment for providing cellular coverage over a geographic area. The service provider 32 also includes a server 36 that is coupled to or is a part of the network 34 and that receives notifications of calls being made to any wireless device, such as the WDD 24, that the service provider 32 services.

The server 36 receives a notification that a call is being placed from the calling device 30 to the WDD 24. The server 36 determines that the call is for connection to the WDD 24, and that the WDD 24 is associated with a subscriber who is also a customer of the service provider 12. For example, the server 36 may include a data structure that identifies a plurality of different telephone numbers, and if a call is being placed to any phone number identified in the data structure, the server 36 generates a call notification that includes the calling address of the calling device 30 and the destination address of the WDD 24, and sends the call notification to the server 16 to inform the server 16 that a call is being placed to the WDD 24. The call notification may comprise the call signaling message received by the server 36, or may be generated based on the received call signaling message. In one embodiment, the server 36 provides the call notification to the server 16 due to an agreement between the service provider 12 and the service provider 32 to provide such information in return for compensation to the service provider 32 by the service provider 12, or vice versa.

The server 16 receives the call notification from the server 36 and makes a determination that the WDD 24 is within a predetermined proximity of the media station 18. This determination may be made in any number of ways, as will be discussed in greater detail herein. In one embodiment, the server 16 maintains a status indicator that indicates whether or not at any given time the WDD 24 is within the predetermined proximity of the media station 18. The status indicator may be set based on location messages from the media station 18 or the WDD 24 that indicate to the server 16 that the WDD 24 is within the predetermined proximity of the media station 18. Thus, to make the determination, the server 16 merely checks the status indicator.

For example, in one embodiment the media station 18 may be coupled to a wireless access point (WAP) 38. The WDD 24 may be capable of Wi-Fi communications, and when the WDD 24 comes within radio frequency (RF) range of the WAP 38, the WAP 38 and the WDD 24 automatically exchange information via Wi-Fi to determine whether the WDD 24 is authorized to connect to the WAP 38. For example, the WDD 24 may provide the WAP 38 an appropriate password, such as a Wired Equivalent Privacy (WEP) or Wi-Fi Protected Access (WPA) key. Upon connection of the WDD 24 to the WAP 38, the WAP 38 may send a message to the media station 18 informing the media station 18 that the WDD 24 has connected to the WAP 38. The media station 18 may then generate a location message that indicates the WDD 24 is within the predetermined proximity of the media station 18, and communicate the location message to the server 16. The server 16 receives the message and updates the status indicator to indicate that the WDD 24 is within the predetermined proximity of the media station 18. In another embodiment, in lieu of or in addition to the WAP 38, the media station 18 may be in communication with a femtocell that is also communicatively coupled to the WDD 24, and which may be able to provide the media station 18, or the server 16, information regarding the location of the WDD 24.

In another embodiment, the media station 18 may, rather than be coupled to the WAP 38, have an integrated WAP that operates similarly to the WAP 38 as described above. In another embodiment, the user 14 may log in to the media station 18 when the user 14 desires to view programming on the display device 22. Upon successful login, the media station 18 generates a location message that indicates the WDD 24 is within the predetermined proximity of the media station 18, and communicates the location message to the server 16.

Similarly, location messages indicating that the WDD 24 is no longer within the predetermined proximity of the media station 18 may be generated when the WAP 38 determines that the WDD 24 is no longer within Wi-Fi range, or when the user 14 logs out of the media station 18. The server 16 updates the status indicator accordingly.

Upon determining that the WDD 24 is within the predetermined proximity of the media station 18, the server 16 communicates a caller identifier to the media station 18. The media station 18 generates a graphic overlay that includes the caller identifier, and presents the graphic overlay on the display device 22. The user 14 can then choose to accept the call, which may be simultaneously ringing as the graphic overlay is being presented on the display device 22, or may choose to ignore the call.

Figure 2:
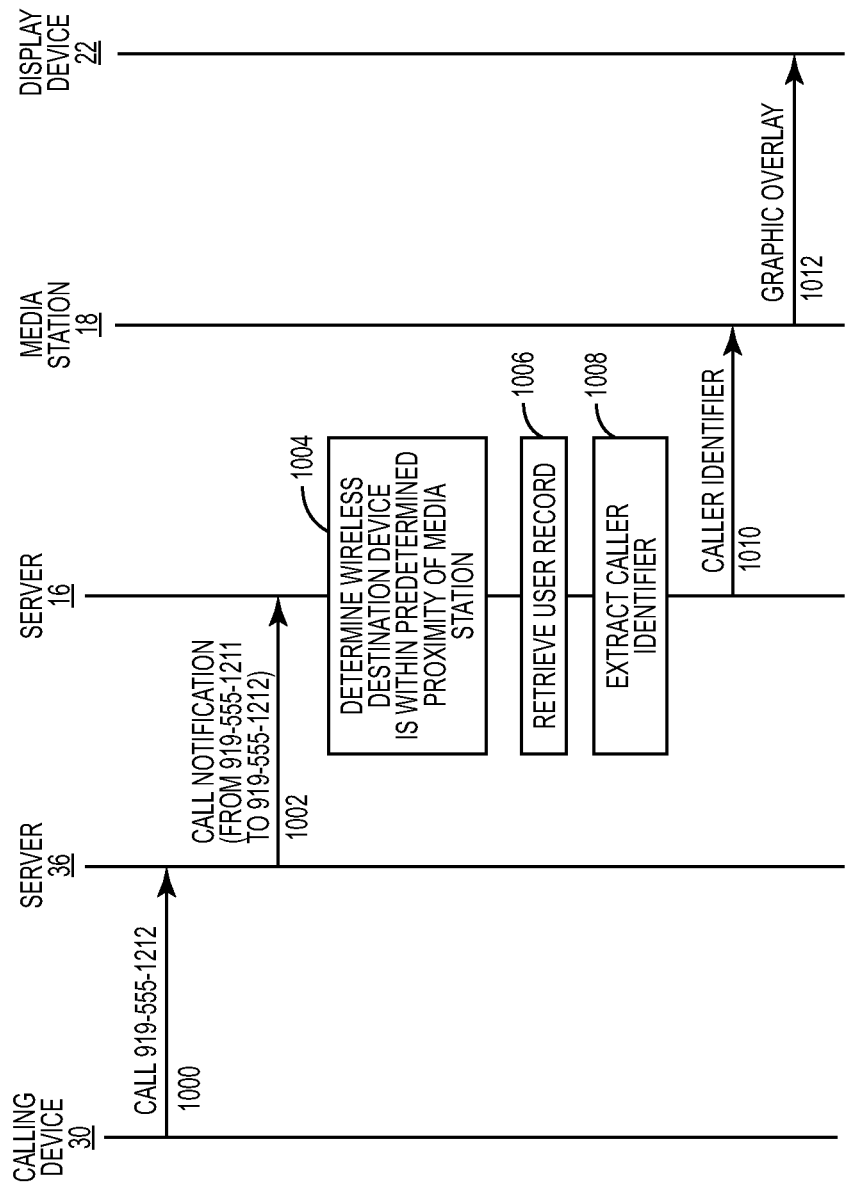
FIG. 2 is a message flow diagram illustrating an exemplary sequence of messages between components according to one embodiment.

FIG. 2 is a message flow diagram illustrating an exemplary sequence of messages between components according to one embodiment. FIG. 2 will be discussed in conjunction with FIG. 1. Assume, as discussed with regard to FIG. 1, that the user 26 desires to place a phone call to the user 14. The user 26 initiates a call to the WDD 24 via the calling device 30. The calling device 30 generates call signaling information that indicates a call is being placed to the phone number, in this example 919-555-1212, of the WDD 24. The signaling information is provided to the server 36 of the service provider 32 because the WDD 24 subscribes to cellular service through the service provider 12 (FIG. 2, step 1000). The server 36 determines that the phone number 919-555-1212 is associated with the service provider 12, and generates a call notification that includes the calling address, in this case the phone number of the calling device 30 (i.e., 919-555-1211), and the destination address, i.e., 991-555-1212. The server 36 communicates the call notification to the server 16 (FIG. 2, step 1002). The server 16 determines that the WDD 24 is within the predetermined proximity of the media station 18 (FIG. 2, step 1004).

In one embodiment, the user 14 can configure user data 40 (FIG. 1) to associate one or more custom caller identifiers with one or more potential calling addresses. For example, the user 14 may know that certain individuals associated with particular calling addresses call the user 14 frequently, and may want particular a particular caller identifier, or caller identifiers, presented on the display device 22 that is associated with the particular caller other than, or in addition to, the calling address. A caller identifier may be visually perceivable, such as a name, a textual description, an image, an icon, an avatar, or the like. A caller identifier may also be audibly perceivable, such as a song clip, ringtone, or the like. Some caller identifiers, such as a video clip, may be both visually and audibly perceivable. The user 14 may configure multiple caller identifiers for a particular caller, so that text, image and music, for example, are rendered via the display device 22 upon receipt of a call notification indicating a call from the corresponding calling address, assuming that the display device 22 is also capable of rendering audio. This data may be stored as a particular user record that corresponds to the user 14 in the user data 40.

The server 16 retrieves the user record from the user data 40 that corresponds to the user 14, determines that the user has associated a particular caller identifier with the calling address 919-555-1211, and extracts the caller identifier from the user record (FIG. 2, steps 1006-1008). The server 16 communicates the extracted caller identifier(s) to the media station 18 for presentation on the display device 22 (FIG. 2, step 1010). The media station 18 then generates a graphic overlay that includes any visually perceivable caller identifiers, such as text, images or video, and provides the graphic overlay along with any audio caller identifiers, if any, to the display device 22 for presentation to the user 14 (FIG. 2, step 1012). In one embodiment, in addition to caller identifiers, the server 16 may provide additional information relating to the caller, such as a location of the calling device 30, or information about calling party capabilities such as an ability to support video or the like. The caller location may be provided in the call notification, or provided upon request by the server 16. Additional information, such as calling party capabilities, may be configured in the user data 40, or may be obtained by the server 16 via an exchange of messages with the server 36, for example. In another embodiment, the server 16 may determine a caller identifier by doing a network lookup based on the calling address. For example, the server 16 may use the calling address to initiate an ENUM query, and use the return information as a caller identifier that is provided to the media station 18.

Figure 3:
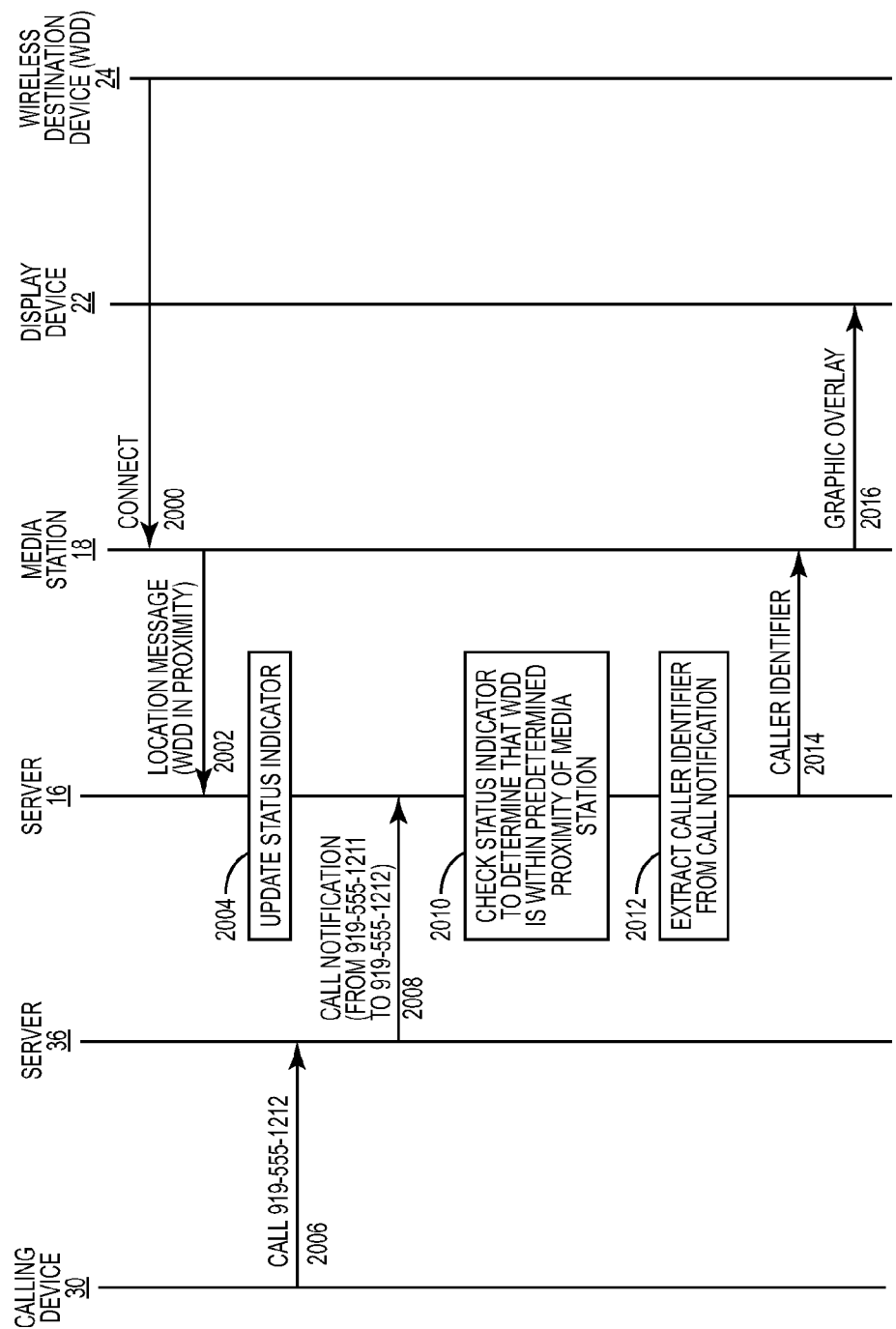
FIG. 3 is a message flow diagram illustrating an exemplary sequence of messages between components according to another embodiment.

FIG. 3 is a message flow diagram illustrating an exemplary sequence of messages between components according to another embodiment. FIG. 3 will be discussed in conjunction with FIG. 1. In this embodiment assume that the media station 18 has an integrated WAP and facilitates Wi-Fi communications with devices that are within Wi-Fi range of the media station 18 and that are authorized to communicate with the media station 18 via Wi-Fi. Initially, the user 14 arrives at home, and upon coming within Wi-Fi range of the WAP 38, the WDD 24 establishes a Wi-Fi connection with the media station 18, including providing the media station 18 suitable credentials such as a WEP or WPA password (FIG. 3, step 2000). The media station 18 then generates a location message indicating that the WDD 24 is within the predetermined proximity of the media station 18 and sends the location message to the server 16 (FIG. 3, step 2002). In another embodiment, the WDD 24 may make a determination that it is within a predetermined proximity of the media station 18 and may send a message to the media station 18 indicating that the WDD 24 is within a predetermined proximity of the media station 18, and the media station 18 in turn generates and sends a location message to the server 16. The server 16 updates the status indicator associated with the WDD 24 (FIG. 3, step 2004). Assume again that, as discussed with respect to FIG. 2, the user 26 wishes to speak to the user 14, and initiates a telephone call to the WDD 24. Signaling information is provided to the server 36 of the service provider 32 because the WDD 24 subscribes to cellular service through the service provider 32 (FIG. 3, step 2006). The server 36 determines that the phone number 919-555-1212 is associated with the service provider 12, and generates a call notification that includes the calling address, in this case the phone number of the calling device 30 (i.e., 919-555-1211), and the destination address, i.e., 991-555-1212. The server 36 communicates the call notification to the server 16 (FIG. 3, step 2008). The server 16 determines that the WDD 24 is within the predetermined proximity of the media station 18 by accessing the status indicator associated with the WDD 24 (FIG. 3, step 2010).

Assume that the user 14 has not designated a custom caller identifier in the user data 40 for the calling address. The server 16 therefore extracts the caller identifier from the call notification received from the server 36 (FIG. 3, step 2012). For example, the caller identifier may comprise the calling address, in this example the telephone number 919-555-1211. In other embodiments, during the initiation of a call, the calling device 30 may include in the call signaling a caller identifier other than the calling address, such as an image of the user 26 or video clip. In those embodiments, the server 16 extracts the image or video clip from the call notification. As discussed with regard to FIG. 2, the server 16 then communicates the caller identifier to the media station 18 for presentation on the display device 22 (FIG. 3, steps 2014-2016).

Whether or not caller identifiers are provided to the media station 18 may be based on any number of criteria, including, for example, the particular calling address, the time of day, day of week, or a programmed or configured data and time interval. The criteria may also be based on a particular program that is being provided to the media station 18, such that caller identifier information is never provided during a particular program, or always provided during a particular program. Such criteria could be in addition to, or in lieu of, whether or not the WDD 24 is within the predetermined proximity of the media station 18. Such criteria could be user configurable by the user 14 and stored, for example, in the user data 40.

Figure 4:
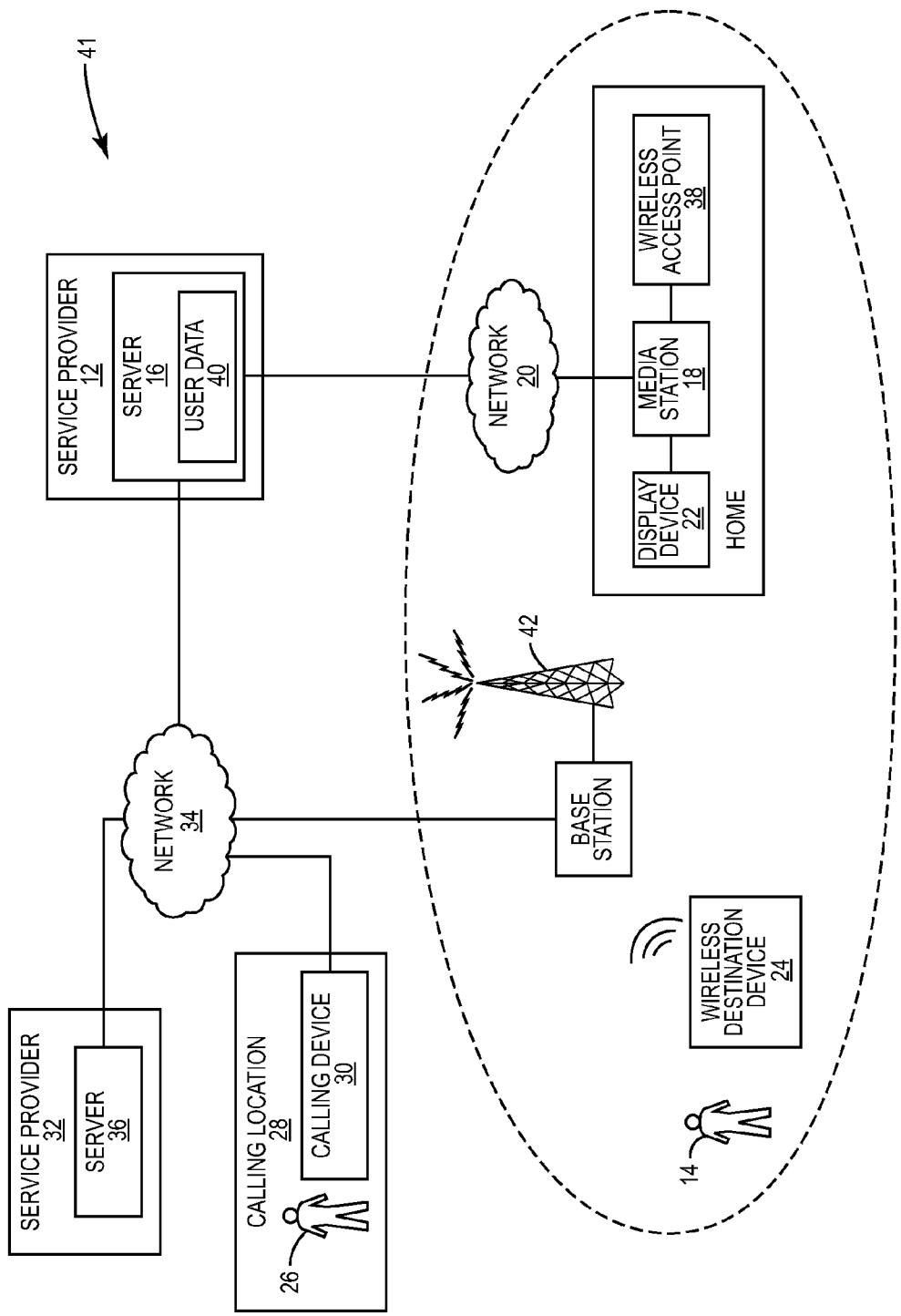
FIG. 4 is a block diagram of another exemplary system in which embodiments of the present disclosure may be practiced.
Figure 5:
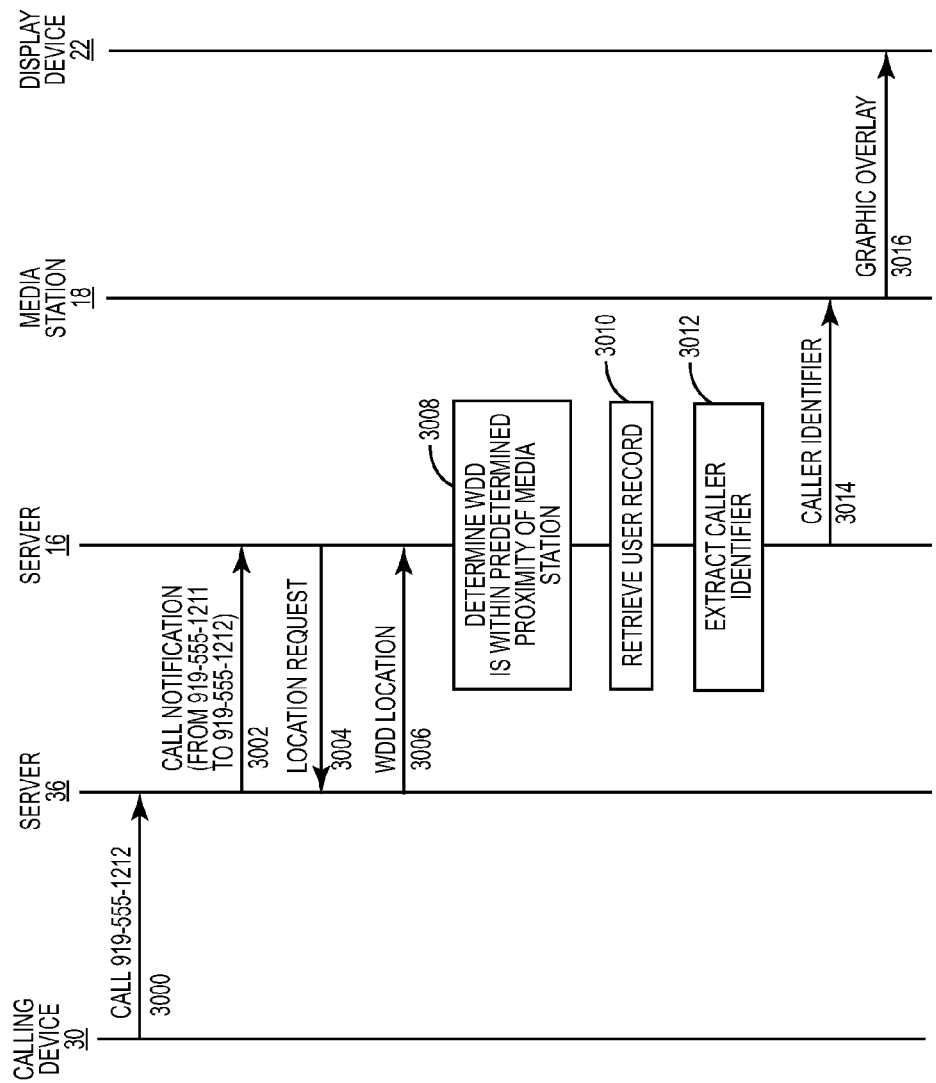
FIG. 5 is a message flow diagram illustrating an exemplary sequence of messages between components according to embodiments that may be practiced in the system illustrated in FIG. 4.

FIG. 4 is a block diagram of an exemplary system 41 in which embodiments of the present disclosure may be practiced. FIG. 5 is a message flow diagram illustrating an exemplary sequence of messages between components according to embodiments that may be practiced in the system 41 illustrated in FIG. 4. FIG. 5 will be discussed in conjunction with FIG. 4. In this embodiment, similar to those discussed in FIGS. 2 and 3, the user 26 desires to call the user 14 and initiates a telephone call to the WDD 24 via the calling device 30. Call signaling is sent to the server 36, which in turn generates and sends a call notification to the server 16 that identifies the call as coming from the calling address and being for connection to the destination address associated with the WDD 24 (FIG. 5, steps 3000-3002). Assume for purposes of illustration that the user 14 is not present in the home when the call is originated. In this embodiment, the server 16 sends the server 36 a location request message that requests the current location of the WDD 24 (FIG. 5, step 3004). Because the server 36 provides wireless service to the WDD 24, the server 36 determines the current location of the WDD 24, and provides this information to the server 16 (FIG. 5, step 3006). The current location may be identified in any desirable manner, such as longitude and latitude coordinates, or the coordinates of a cell tower 42 with which the WDD 24 is currently in communication. The server 16 then determines whether the current location of the WDD 24 is within the predetermined proximity of the media station 18 (FIG. 5, step 3008). This determination may be made in any desirable manner. For example, the determination may be made by determining a distance between the longitude and latitude of the WDD 24 and that of the media station 18, and comparing that distance to a threshold, such as 100 feet.

In another embodiment, the location of the cell tower that services the home of the user 14, in this example the location of the cell tower 42, is stored as part of the user record that is associated with the user 14. The location information received from the server 36 may identify the location of the cell tower which is currently servicing the WDD 24. The server 16 may access the user record associated with the user 14 and determine that the cell tower that is currently servicing the WDD 24 is the same cell tower that services the home of the user 14, and based on this determination, determines that the user 14 is within the predetermined proximity of the media station 18.

Upon determining that the WDD 24 is within the predetermined proximity of the media station 18, the server 16 may retrieve the user record associated with the user 14, extract a caller identifier based on the calling address, and provide the caller identifier to the media station 18 for presentation on the display device 22 (FIG. 5, steps 3010-3016).

In yet another embodiment, the WDD 24 may determine that it is within a predetermined proximity of the media station 18 upon determining that it is being serviced by the cell tower 42. Upon this determination, the WDD 24 may generate and send a location message to the server 16 indicating that the WDD 14 is within the predetermined proximity of the media station 18. The server 16 may then update the status indicator.

In one embodiment, the media station 18 may determine that the WDD 24 is within a predetermined proximity of the media station 18 by capturing an image, or video stream, via an integrated camera, and comparing such images with pre-stored images of the user 14. In one embodiment, the media station 18 may be informed of an incoming call notification, generate an image in response, compare the image to a pre-stored image of the user 14, and, based on the comparison, determine that the WDD 24 is within the predetermined proximity of the media station 18. In another embodiment, the media station 18 may periodically generate images, compare the images to a pre-stored image of the user 14, and if there is a match, the media station 18 may inform the server 16 via a location message that the WDD 24 is within a predetermined proximity of the media station 18.

Figure 6:
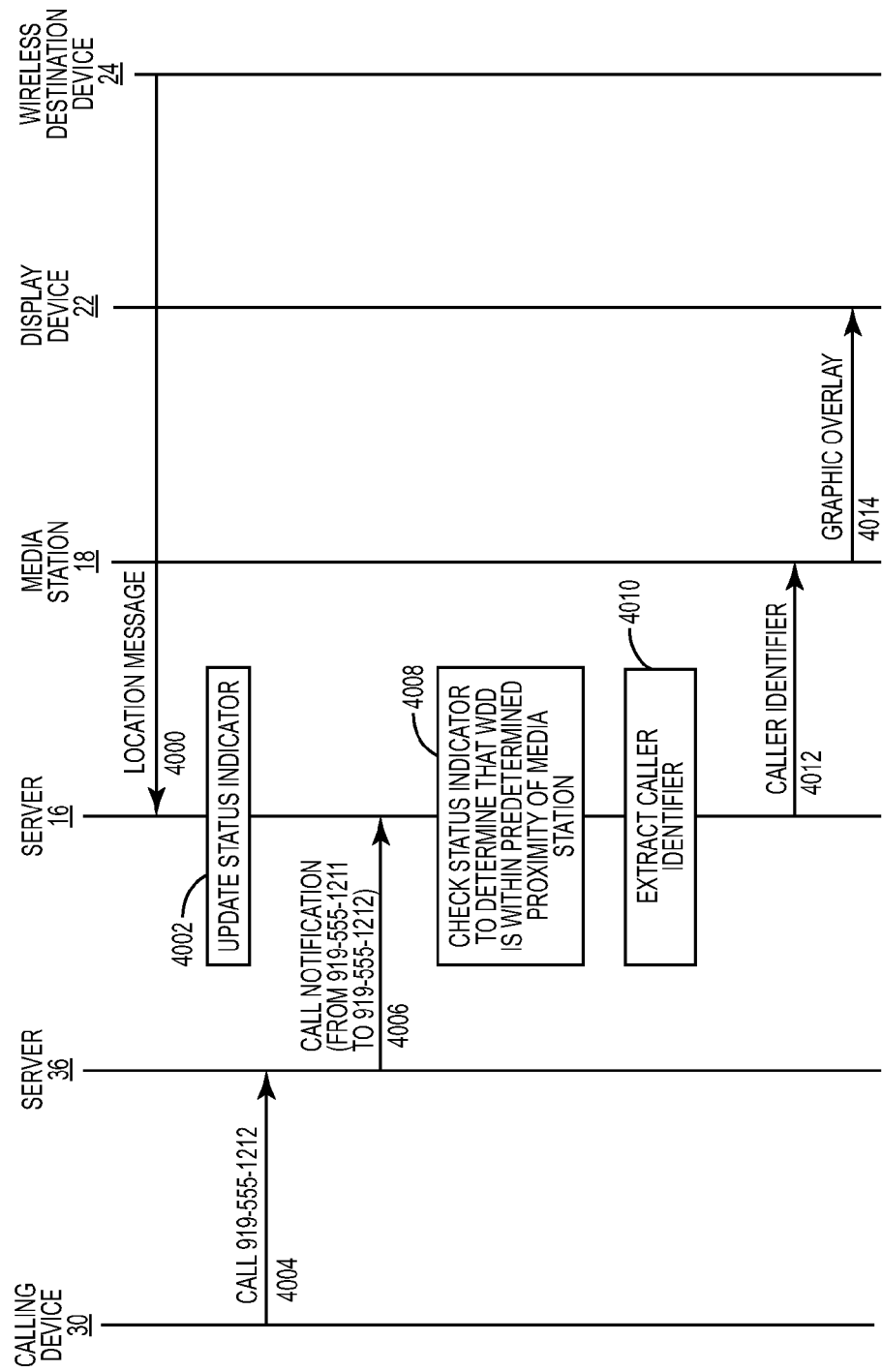
FIG. 6 is a message flow diagram illustrating an exemplary sequence of messages between components according to one embodiment.

FIG. 6 is a message flow diagram illustrating an exemplary sequence of messages between components according to one embodiment. FIG. 6 will be discussed in conjunction with FIG. 4. In this embodiment, the WDD 24 determines that it is within a predetermined proximity of the media station 18, and upon such determination, generates and sends a location message to the server 16 indicating that the WDD 24 is within the predetermined proximity of the media station 18 (FIG. 6, steps 4000-4002). The WDD 24 may determine that it is within the predetermined proximity of the media station 18 in any desirable manner. In one embodiment, the WDD 24 maintains a cell tower identifier that identifies the cell tower 42 as the cell tower that services the home of the user 14. Each time the WDD 24 is handed off to a new cell tower, the WDD 24 compares the new cell tower to the stored cell tower identifier. Upon determining that the WDD 24 has been handed off to the cell tower 42, the WDD 24 determines that it is within the predetermined proximity of the media station 18.

In another embodiment, the WDD 24 includes a GPS receiver and continually monitors its location. The WDD 24 also maintains a location of a reference location, such as the location of the media station 18, or that of the home of the user 14. Upon determining that the location of the WDD 24 is within a particular distance from the reference location, the WDD 24 determines that it is within the predetermined proximity of the media station 18. Steps 4004-4014 of FIG. 6 may be similar or identical to steps 2006-2016 of FIG. 3, and for purposes of brevity will not be discussed in detail herein.

Figure 7:
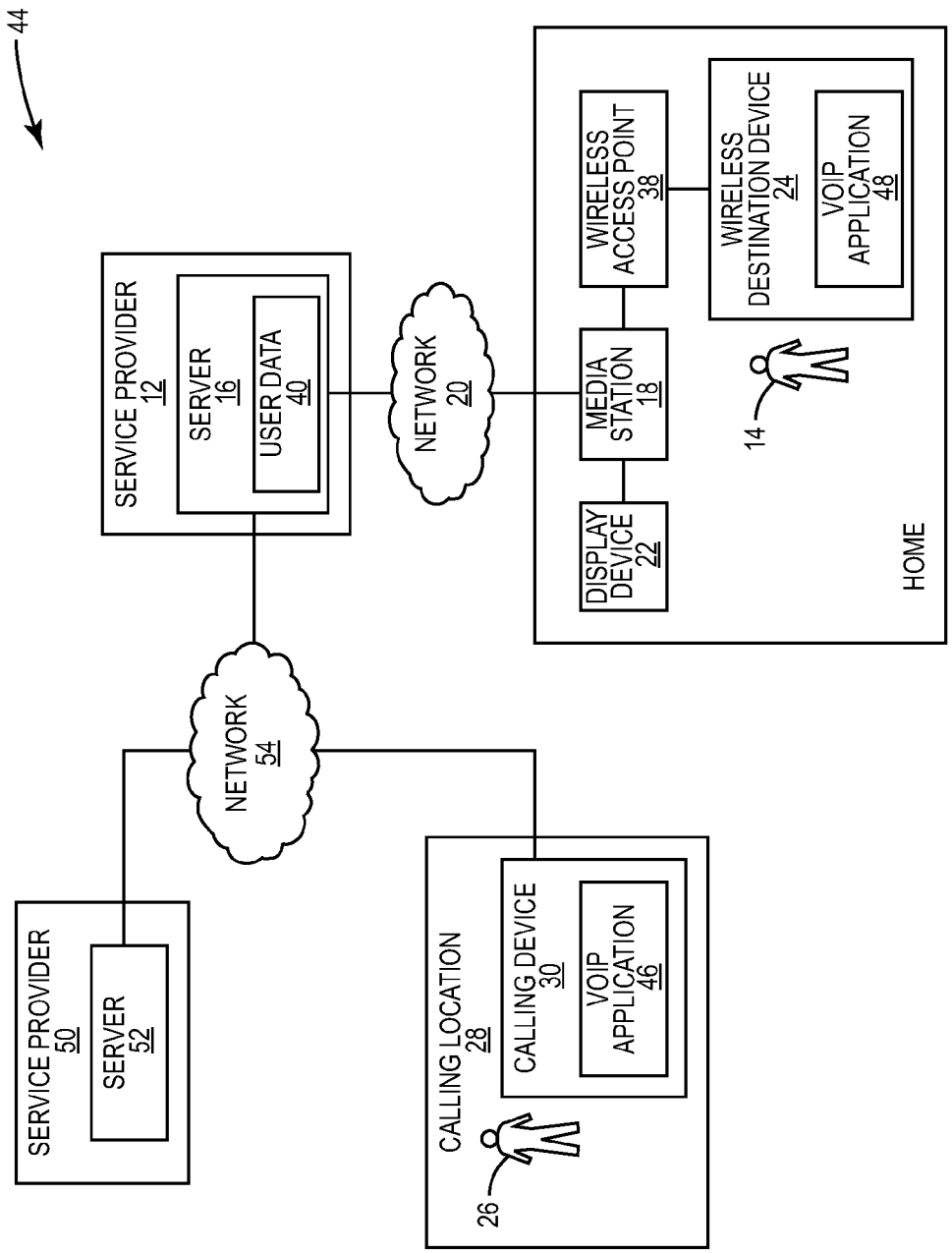
FIG. 7 is a block diagram of an exemplary system in which additional embodiments of the present disclosure may be practiced.
Figure 8:
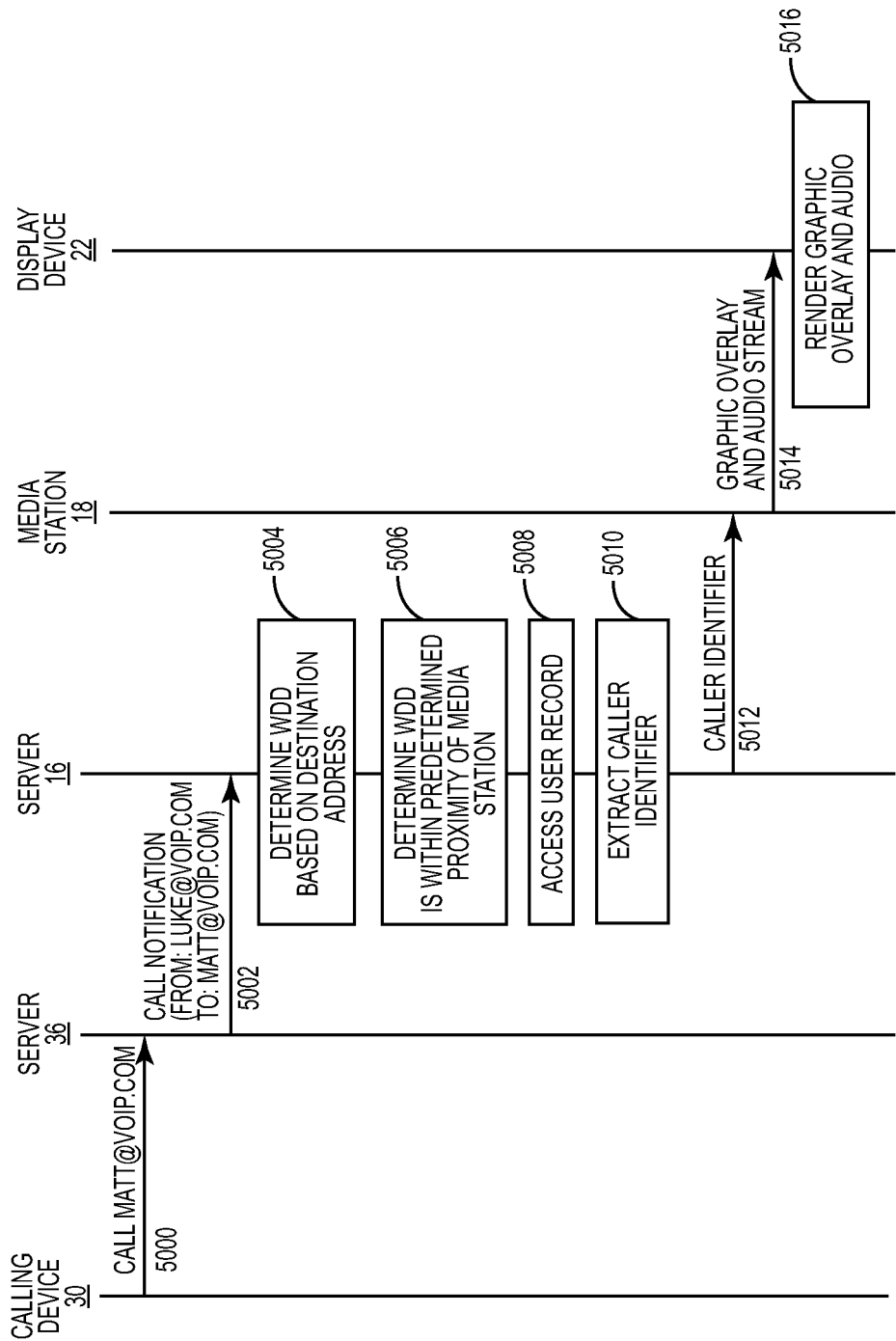
FIG. 8 is a message flow diagram illustrating an exemplary sequence of messages between components according to one embodiment of a packetized voice call.

FIG. 7 is a block diagram of an exemplary system 44 in which additional embodiments of the present disclosure may be practiced. In one particular embodiment, the user 26 desires to call the user 14, as discussed previously, but instead of placing a conventional PSTN call, the user 26 initiates the call using a packetized voice application, such as a voice over internet protocol (VOIP) application 46. FIG. 8 is a message flow diagram illustrating an exemplary sequence of messages between components according to one embodiment of such a packetized voice call. FIG. 8 will be discussed in conjunction with FIG. 7. The user 26 desires to speak with the user 14, who is capable of packetized voice communications by virtue of a VOIP application 48 that executes on the WDD 24. To initiate a VOIP call, the user 26 interacts with the VOIP application 46 via the calling device 30 and indicates a desire to communicate with the user 14. Specifically, the VOIP application 46 may display a contacts directory to the user 26, who selects the contact entry that corresponds to the user 14. In response to the selection, the VOIP application 46 generates call signaling information for facilitating a VOIP call between the user 26 and the user 14. Among other information, the call signaling information identifies a destination address that is associated with the user 14. Such destination address may be configured into the contacts directory, for example, and may comprise any suitable format, such an IP address format, session initiation protocol (SIP) address format, or a format that is proprietary to the particular VOIP application 46. As will be appreciated by those of skill in the art, irrespective of the address format, such calls are typically ultimately resolved to a particular IP address associated with the destination device to which the call is connected.

A VOIP telephone service is typically provided by a VOIP service provider, such as the service provider 50. The service provider 50 has one or more servers 52 that are responsible for facilitating calls made by its subscribers, such as the users 26 and 14. The servers 52 comprise processing devices that include processors, circuitry and software that implements the functionality for facilitating VOIP calls of its subscribers, as described in part herein. The VOIP application 46 communicates the call signaling information via a call signaling message over a network 54 to the server 52 (FIG. 8, step 5000). The network 54 may comprise any combination of private and/or public communication networks, such as the Internet. In one embodiment, the calling device 30 has both cellular capabilities as well as Wi-Fi capabilities, and if the calling device 30 is within Wi-Fi range of a Wi-Fi network, the network 54 may comprise a combination of a private LAN and the Internet. In another embodiment, where the calling device 30 is not within Wi-Fi range of a Wi-Fi network, the network 54 may comprise a data network of a cellular service provider.

The server 52 determines that the intended destination address, in this example Matt@voip.com, is associated with a subscriber who is also a customer of the service provider 12. In response to this determination, the server 52 generates a call notification that includes the calling address that is associated with the calling device 30, in this example "Luke@voip.com," and the destination address included in the call signaling information, in this example "Matt@voip.com," and sends the call notification to the server 16 (FIG. 8, step 5002). The call notification may comprise the call signaling message received by the server 52, or may be generated based on the received call signaling message. In one embodiment, the server 52 maintains a data structure that identifies a plurality of different destination addresses of subscribers of the service provider 12, and if a call is being placed to any subscriber identified in the data structure, the server 52 generates a call notification and sends the call notification to the server 16 to inform the server 16 that a call is being placed to a particular destination address of a subscriber of the service provider 12. In one embodiment, the server 52 provides the call notification to the server 16 due to an agreement between the service provider 12 and the service provider 50 to provide such information in return for compensation to the service provider 50 by the service provider 12, or vice versa.

In one embodiment, the server 16 maintains data that correlates destination addresses used by packetized voice applications, such as the VOIP application 46, with particular devices used by its subscribers, such as the user 14. Such information may be maintained, for example, in the user data 40, or elsewhere. For purposes of illustration, assume that such information is maintained in the user data 40. Upon receipt of the call notification, the server 16 accesses the user data 40 and determines that the destination address Matt@voip.com is associated with the WDD 24 (FIG. 8, step 5004). The server 16 then determines whether the WDD 24 is within the predetermined proximity of the media station 18 using any of the mechanisms discussed above, or any other suitable mechanism for making such determination (FIG. 8, step 5006). The server accesses the user record associated with the user 14 and extracts one or more custom caller identifiers (FIG. 8, steps 5008-5010). The server 16 communicates the one or more caller identifiers to the media station 18 (FIG. 8, step 5012). The media station 18 renders a graphic overlay that depicts the one or more caller identifiers and provides the graphic overlay to the display device 22 for presentation to the user 14, and/or provides any audio-based caller identifiers to the display device 22 for rendering to the user 14 (FIG. 8, step 5014). The display device 22, in this example a flat panel television, renders the graphic overlay on the panel, and plays the audio caller identifiers via its speakers (FIG. 8, step 5016).

Figure 9:
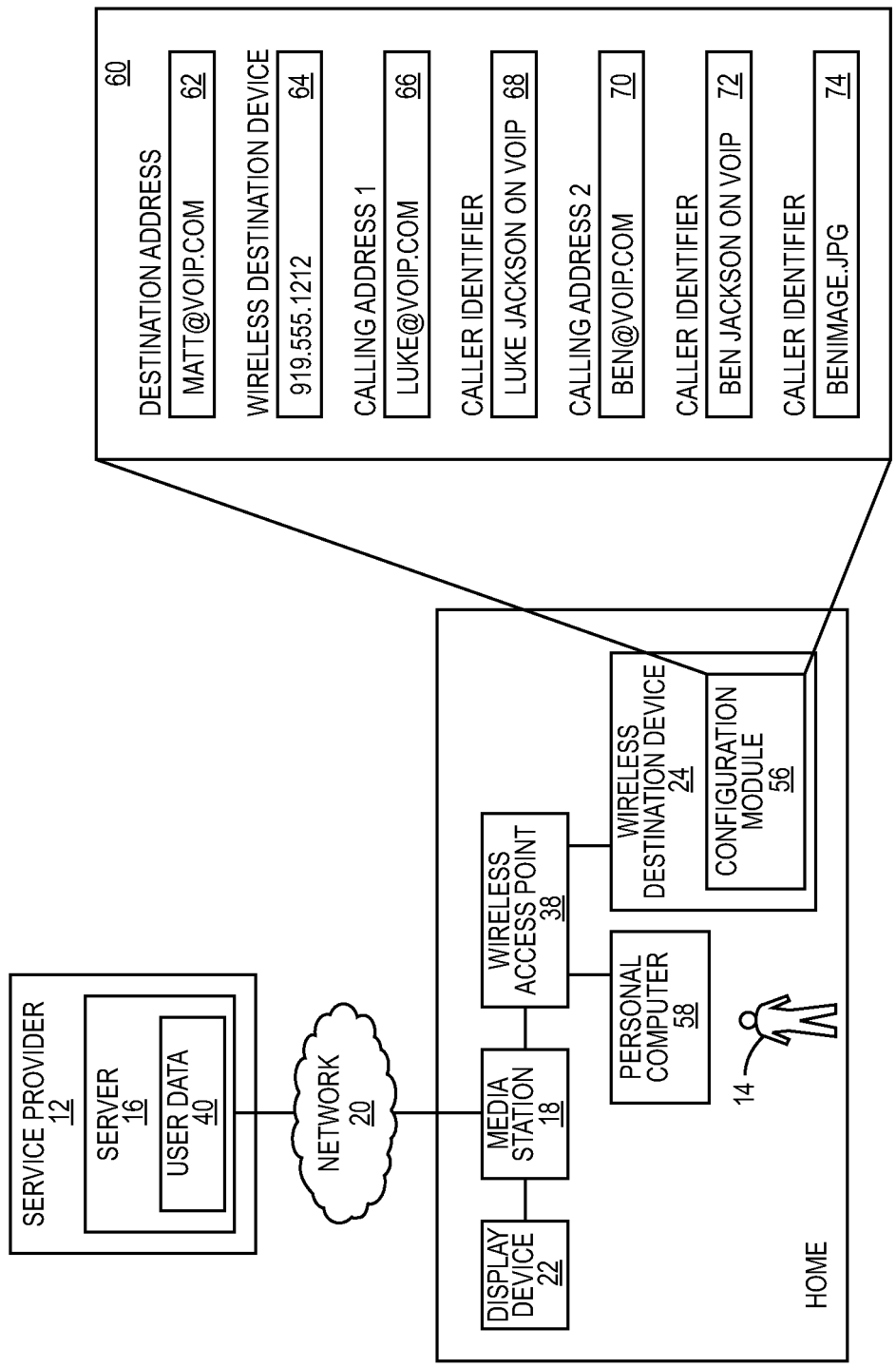
FIG. 9 is a block diagram of exemplary components and an exemplary user interface for facilitating the user configuration of caller identifiers according to one embodiment.

In one embodiment, the user 14 may configure the user record that is stored in the user data 40 to provide custom caller identifiers for one or more calling addresses for calls that are for connection with one or more WDDs, such as the WDD 24. FIG. 9 is a block diagram of exemplary components and an exemplary user interface for facilitating the user configuration of caller identifiers according to one embodiment. In particular, the user 14 may access a configuration module 56 that allows the modification of a user record that corresponds to the user 14. In particular, the configuration module 56 may be implemented via a web page, or web application, that is provided to a processing device, such as the WDD 24 or a personal computer 58, by the server 16 upon entry in a web browser of the appropriate uniform resource locator (URL). Alternatively, the configuration module 56 may comprise an application that executes on the WDD 24, or the personal computer 58, after being downloaded from the server 16, or other server designated by the service provider 12.

The configuration module 56 may provide a user interface 60 that allows the user 14 to provide a custom caller identifier for a calling address associated with a VOIP service, such as the VOIP service provided by the service provider 50 (FIG. 7), and for correlating a VOIP destination address with a particular WDD. The user interface may include a destination address field 62 that allows the user to identify a particular VOIP destination address that is associated with the user 14, in this example MATT@VOIP.COM. The user interface may also include a WDD field 64 that allows the user 14 to designate a particular WDD as being associated with the VOIP destination address provided in the destination address field 62. In this example, the user 14 associated the WDD 24 with the VOIP destination address MATT@VOIP.COM. The user interface provides a calling address 1 field 66 to allow the user 14 to designate a particular calling address to which a custom caller identifier is being provided. A caller identifier field 68 allows the user 14 to designate the textual caller identifier "LUKE JACKSON ON VOIP" as a customer caller identifier that will be rendered on the display device 22 when a call is placed to the VOIP address of the user 14 by the calling address "LUKE@VOIP.COM."

The user interface 60 may allow the user 14 to designate any number of custom caller identifiers for any number of different calling addresses. As a second example, the user interface 60 contains a calling address 2 field 70 that allows the user 14 to designate another calling address for which one or more custom caller identifiers will be provided. In this example, the user 14 has entered into a caller identifier field 72 a textual caller identifier "BEN JACKSON ON VOIP," and into a caller identifier field 74 a filename of an image entitled 'BENIMAGE.JPG." Consequently, upon receipt of a call from the calling address BEN@VOIP.COM, the server 16 will provide the textual caller identifier identified in the caller identification field 72 and the image caller identifier identified in the caller identification field 74 to the media station 18 for rendering on the display device 22. Upon completion of the appropriate information into the user interface 60, the user 14 may select a control, such as a "SAVE" control (not illustrated), to cause the server 16 to store the information in a user record in the user data 40.

Figure 10:
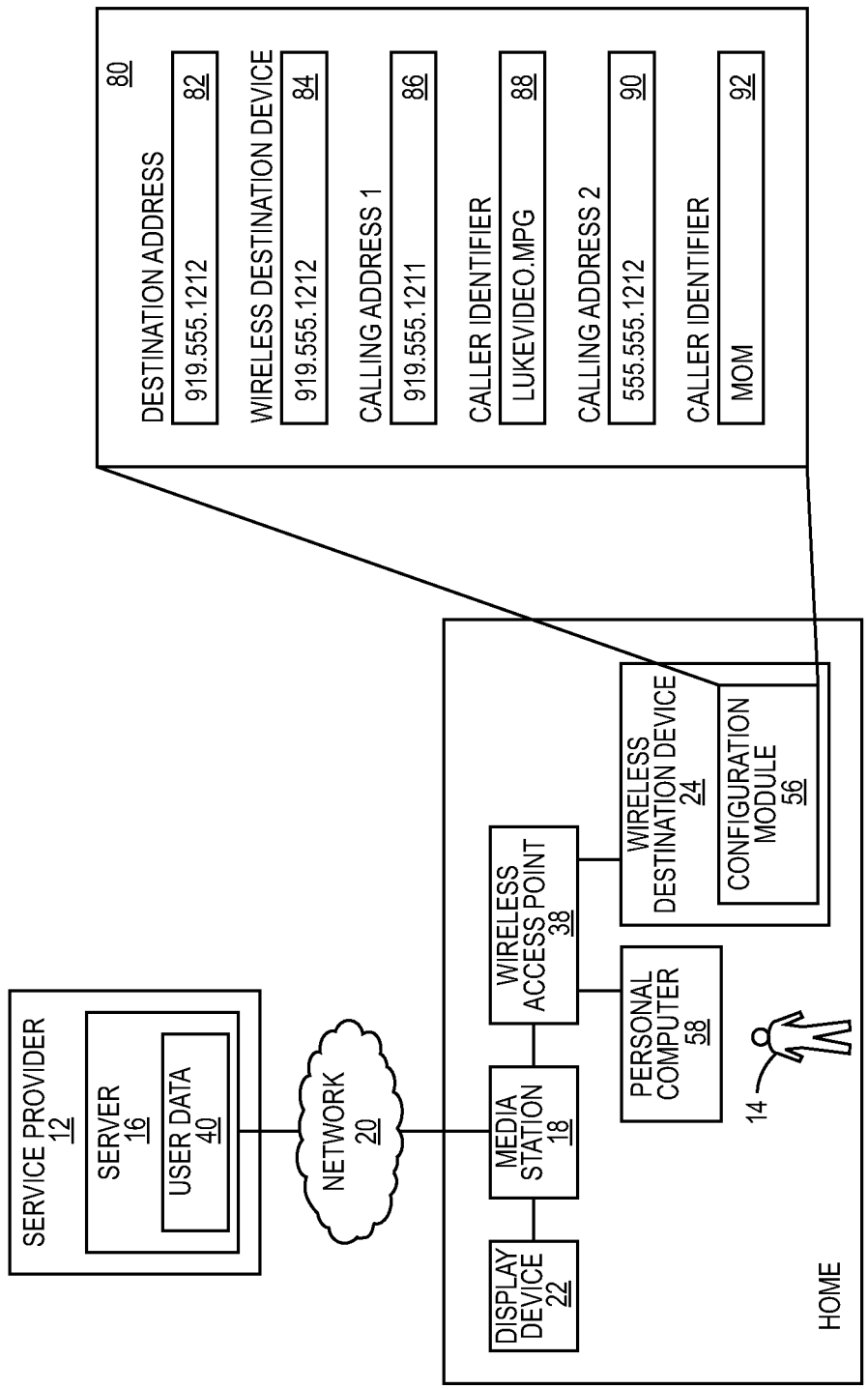
FIG. 10 is a block diagram illustrating another exemplary user interface for facilitating the user configuration of caller identifiers.

FIG. 10 is a block diagram illustrating another exemplary user interface for facilitating the user configuration of caller identifiers. In this example, the user 14 is provided a user interface 80 that enables the user 14 to designate one or more custom caller identifiers for conventional PSTN calling addresses, such as telephone numbers. The user interface 80 includes a destination address field 82 that permits the user 14 to associate a particular destination address, i.e., a destination telephone number, with one or more custom caller identifiers. A WDD field 84 allows the user 14 to correlate the destination address identified in the destination address field 82 with a particular WDD. In this case, since the user 14 desires that calls placed for connection with the WDD 24 be correlated with the destination address provided in the destination address field 82, so the same telephone number is provided in the WDD field 84. A calling address field 86 allows the user 14 to designate a particular calling address with which the custom caller identifiers will be associated. The user 14 has designated a video clip entitled "LUKEVIDEO.MPG" in the caller identifier field 88, so that upon receipt of a call from the phone number 919.555.1211, the designated video clip will be rendered on the display device 22.

Fields 90 and 92 allow the user 14 to designate a different caller identifier for a different calling address. While for purposes of illustration only two calling addresses are shown, it should be apparent that the configuration module 56 may allow the user 14 to designate custom caller identifiers for any number of calling addresses.

Figure 11:
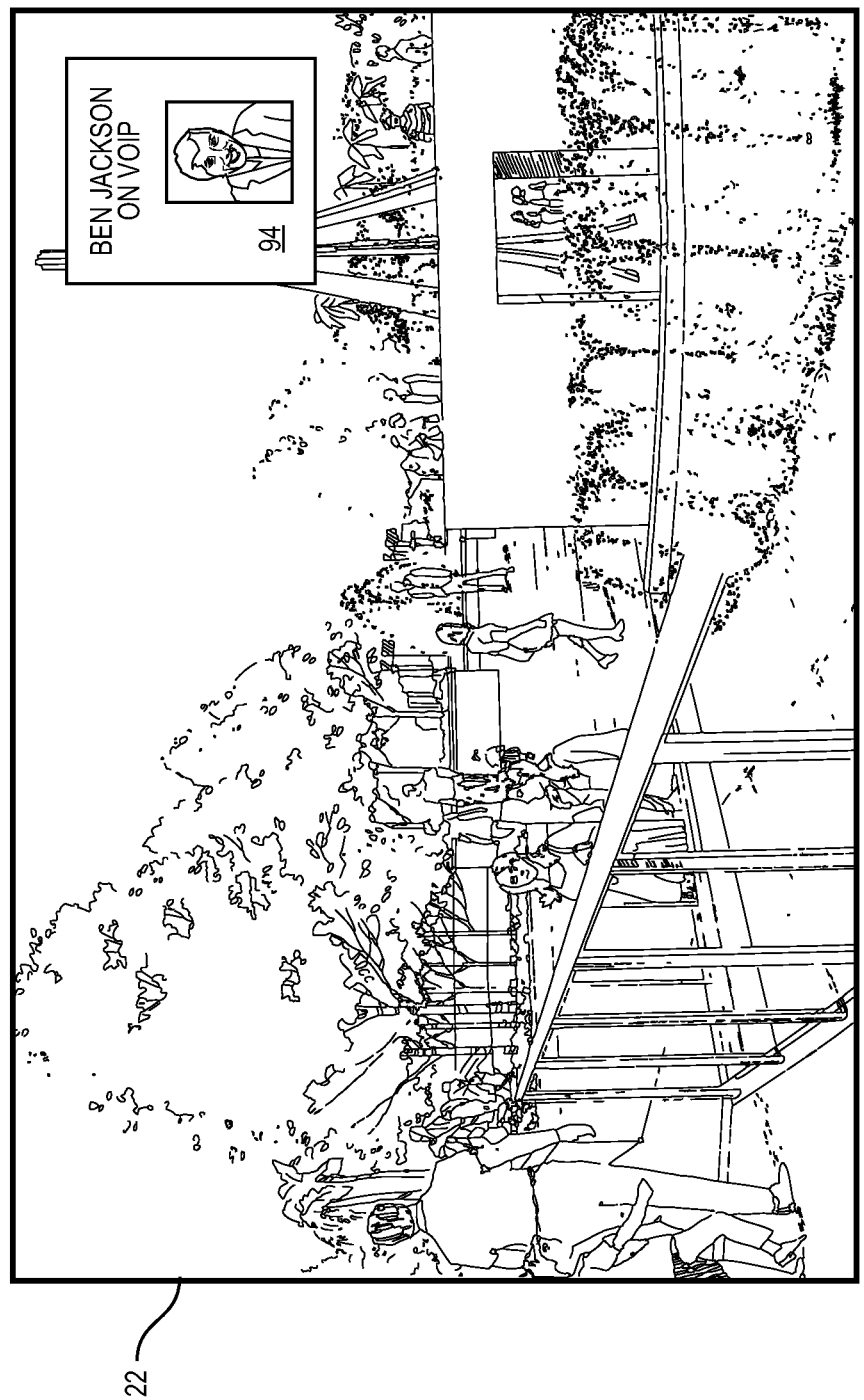
FIG. 11 is a diagram of an exemplary presentation of custom caller identifier information according to one embodiment.

FIG. 11 is a diagram of an exemplary presentation of custom caller identifier information on the display device 22. FIG. 11 will be discussed in conjunction with FIG. 9. Assume that the server 16 received a call notification that a call from the calling address "BEN@VOIP.COM" is being made for connection with the destination address "MATT@VOIP.COM." The server 16 obtains the user record associated with the destination address "MATT@VOIP.COM." Assume this user record contains information provided by the user 14 as illustrated in FIG. 9. The server 16 determines that the destination address "MATT@VOIP.COM" is associated with the WDD 24, and determines that the WDD 24 is within the predetermined proximity of the media station 18. The server 16 then extracts the caller identifiers from the caller identifier fields 72 and 74, in particular a textual description and an image. The server 16 provides this information to the media station 18. The media station 18 generates a graphic overlay 94 that includes the textual caller identifier "BEN JACKSON ON VOIP," as well as the image BENIMAGE.JPG.

Figure 12:
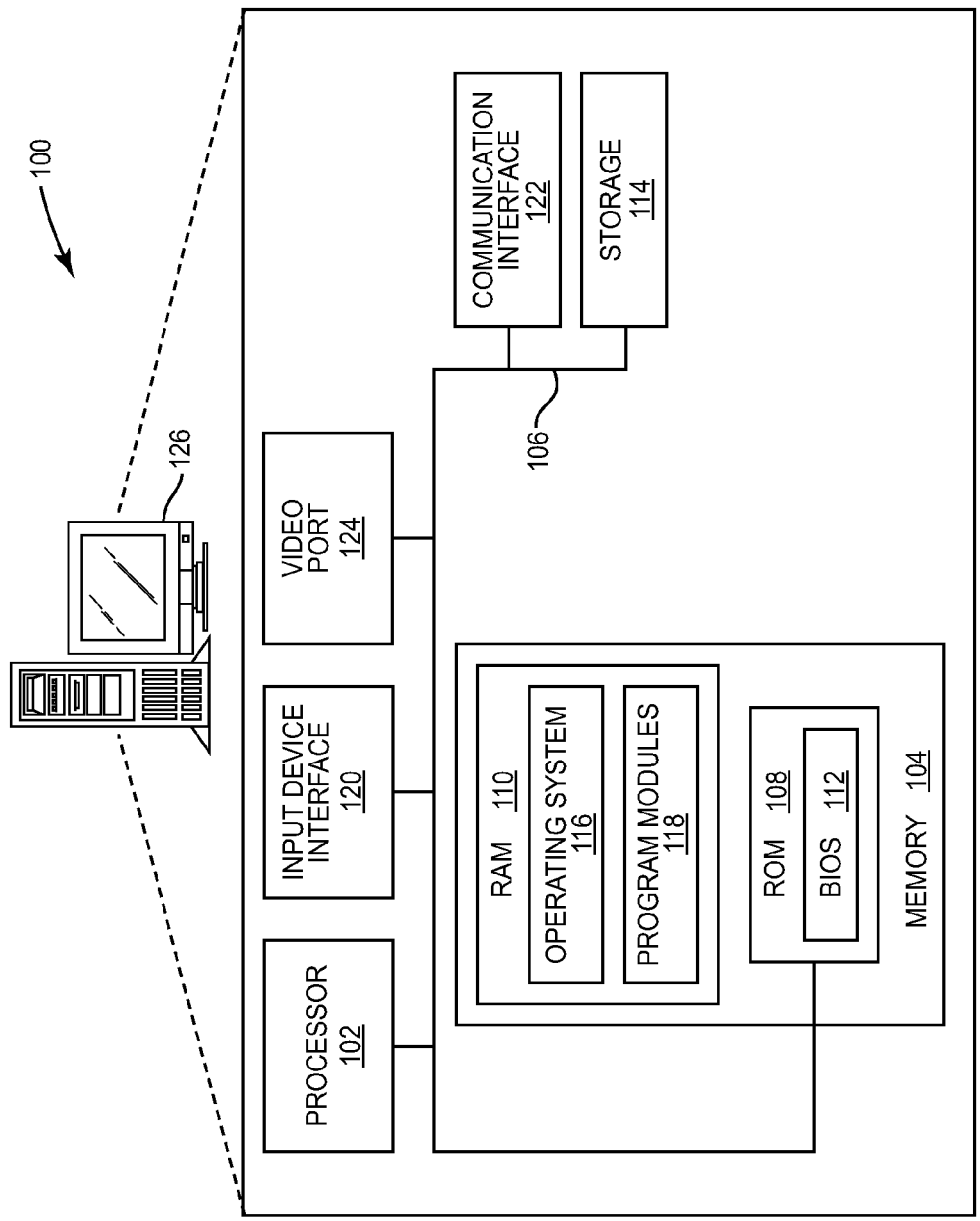
FIG. 12 is a block diagram of a processing device suitable for implementing a server according to one embodiment.

FIG. 12 is a block diagram of a processing device 100 suitable for implementing the server 16 according to one embodiment. The processing device 100 may comprise a workstation, a telecommunications switch, or the like. The processing device 100 includes the processor 102, a system memory 104, and a system bus 106. The system bus 106 provides an interface for system components including, but not limited to, the system memory 104 and the processor 102. The processor 102 can be any of various commercially available or proprietary processors. Dual microprocessors and other multi-processor architectures may also be employed as the processor 102.

The system bus 106 may be any of several types of bus structures that may further interconnect to a memory bus (with or without a memory controller), a peripheral bus, and/ or a local bus using any of a variety of commercially available bus architectures. The system memory 104 may include non-volatile memory 108 (e.g., read only memory (ROM), erasable programmable read only memory (EPROM), electrically erasable programmable read only memory (EEPROM), etc.) and/or volatile memory 110 (e.g., random access memory (RAM)). A basic input/output system (BIOS) 112 may be stored in the non-volatile memory 108, and can include the basic routines that help to transfer information between elements within the processing device 100. The volatile memory 108 may also include a high-speed RAM such as static RAM for caching data.

The processing device 100 may further include the computer-readable storage 114, which may comprise, for example, an internal hard disk drive (HDD) (e.g., enhanced integrated drive electronics (EIDE) or serial advanced technology attachment (SATA)) HDD (e.g., EIDE or SATA) for storage, flash memory, or the like. The storage 114 may store, for example, the user data 40. The drives and associated computer-readable and computer-usable media provide non-volatile storage of data, data structures, computer-executable instructions, and so forth. Although the description of computer-readable media above refers to an HDD, it should be appreciated by those skilled in the art that other types of media which are readable by a computer, such as Zip disks, magnetic cassettes, flash memory cards, cartridges, and the like, may also be used in the exemplary operating environment, and further, that any such media may contain computer-executable instructions for performing novel methods of the disclosed architecture.

A number of program modules can be stored in the storage 114 and in the volatile memory 110, including an operating system 116 and one or more program modules 118, which may implement the functionality described herein in whole or in part, including, for example, functionality described with receiving the call notification that identifies a call originating from a calling address for connection to a destination address, making the determination that the WDD 24 is within the predetermined proximity of the media station 18, communicating the caller identifiers to the media station 18 for presentation on the display device 22, and other processing and functionality described herein. It is to be appreciated that the embodiments can be implemented with various commercially available operating systems 116 or combinations of operating systems 116.

All or a portion of the embodiments may be implemented as a computer program product stored on a non-transitory computer-usable or computer-readable medium, such as the storage 114, which includes complex programming instructions, such as complex computer-readable program code, configured to cause the processor 102 to carry out the steps described herein. Thus, the computer-readable program code can comprise software instructions for implementing the functionality of the embodiments described herein when executed on the processor 102. The processor 102, in conjunction with the program modules 118 in the volatile memory 110, may serve as a control system for the processing device 100 that is configured to, or adapted to, implement the functionality described herein.

An administrator may be able to enter commands and information into the processing device 100 through one or more input devices, such as, for example, a keyboard (not illustrated); a pointing device, such as a mouse (not illustrated); or a touch-sensitive surface. Other input devices may include a microphone, an infrared (IR) remote control, a joystick, a game pad, a stylus pen, or the like. These and other input devices may be connected to the processor 102 through an input device interface 120 that is coupled to the system bus 106, but can be connected by other interfaces such as a parallel port, an IEEE 1394 serial port, a Universal Serial Bus (USB) port, an IR interface, etc.

The processing device 100 may also include one or more communication interfaces 122 for communicating with, for example, various networks, including the networks 20, 34 and 54 discussed herein. The one or more communication interfaces 122 may comprise, for example, wired or wireless network interfaces. The processing device 100 may also include a video port 124 that interfaces with a display 126 that provides information to the administrator.

Those skilled in the art will recognize improvements and modifications to the preferred embodiments of the present disclosure. All such improvements and modifications are considered within the scope of the concepts disclosed herein and the claims that follow.

What is claimed is:

1. A method for providing caller identification information, comprising:
    receiving a call notification that identifies a call originating from a calling address for connection to a destination address associated with a voice-over-IP (VOIP) application executing on a wireless destination device (WDD), the destination address being different from a telephone number of the WDD and comprising one of an internet protocol address, a session initiation protocol address, or an address having a format that is proprietary to the VOIP application;
    making, by a server comprising a processor, a determination that the WDD is within a predetermined proximity of a media station; and
    based on the determination, communicating a caller identifier to the media station for presentation on a display device communicatively coupled to the media station.

2. The method of claim 1, wherein the call notification comprises a calling location identifier that identifies a location of a calling device associated with the calling address, and further comprising communicating calling location information that is based on the calling location identifier to the media station for presentation on the display device communicatively coupled to the media station.

3. The method of claim 1, wherein the call notification comprises the caller identifier.

4. The method of claim 3, wherein the caller identifier comprises the calling address.

5. The method of claim 3, wherein the caller identifier comprises at least one of an image and a video clip.

6. The method of claim 1, further comprising:
    based on the call notification, retrieving a record that corresponds to the calling address; and
    extracting the caller identifier from the record.

7. The method of claim 6, wherein the caller identifier comprises one of an icon corresponding to a caller associated with the calling address, an image corresponding to the caller associated with the calling address, and an avatar corresponding to the caller associated with the calling address.

8. The method of claim 1, wherein making the determination that the WDD is within the predetermined proximity of the media station further comprises:
    sending a location request message to a server associated with a service provider that provides wireless service to the WDD, the location request message requesting location data identifying a location of the WDD;
    receiving the location data from the service provider; and
    determining that the location data identifies a location within the predetermined proximity of the media station.

9. The method of claim 1, wherein the call notification comprises location data identifying a current location of the WDD, and wherein making the determination that the WDD is within the predetermined proximity of the media station comprises determining that the current location is within the predetermined proximity of the media station.

10. The method of claim 1, wherein making the determination that the WDD is within the predetermined proximity of the media station further comprises:
    receiving a location message from the WDD; and
    based on the location message determining that the WDD is within the predetermined proximity of the media station.

11. The method of claim 1, wherein making the determination that the WDD is within the predetermined proximity of the media station further comprises:
    receiving a location message from the media station;
    based on the location message determining that the WDD is within the predetermined proximity of the media station.

12. A processing device for providing caller identification information, comprising:
    a communications interface configured to communicate with a network; and
    a processor coupled to the communications interface, the processor configured to:
        receive a call notification that identifies a call originating from a calling address for connection to a destination address associated with a voice-over-IP (VOIP) application executing on a wireless destination device (WDD), the destination address being different from a telephone number of the WDD and comprising one of an internet protocol address, a session initiation protocol address, or an address having a format that is proprietary to the VOIP application;
        make a determination that the WDD is within a predetermined proximity of a media station; and
        based on the determination, communicating a caller identifier to the media station for presentation on a display device communicatively coupled to the media station.

13. The processing device of claim 12, wherein to make the determination that the WDD is within the predetermined proximity of the media station, the processor is further configured to:
    send a location request message to a server associated with a service provider that provides wireless service to the WDD, the location request message requesting location data identifying a location of the WDD;
    receive the location data from the server; and
    determine that the location data identifies a location within the predetermined proximity of the media station.

14. A computer program product for providing caller identification information, the computer program product stored on a non-transitory computer-readable storage medium and including instructions configured to cause a processor to carry out the steps of:
    receiving a call notification that identifies a call originating from a calling address for connection to a destination address associated with a voice-over-IP (VOIP) application executing on a wireless destination device (WDD), the destination address being different from a telephone number of the WDD and comprising one of an internet protocol address, a session initiation protocol address, or an address having a format that is proprietary to the VOIP application;

making a determination that the WDD is within a predetermined proximity of a media station; and based on the determination, communicating a caller identifier to the media station for presentation on a display device communicatively coupled to the media station.

15. The computer program product of claim 14, wherein the instructions are configured to cause the processor to carry out the steps of:

sending a location request message to a server associated with a service provider that provides wireless service to the WDD, the location request message requesting location data identifying a location of the WDD;

receiving the location data from the server; and determining that the location data identifies a location within the predetermined proximity of the media station.

* * * * *